United States Patent [19]

Deters et al.

[11] 4,343,965

[45] Aug. 10, 1982

[54] BUS BAR ASSEMBLY

[75] Inventors: Paul M. Deters, Manhattan Beach; Harold D. Dove; Mickey E. Billings, both of Anaheim, all of Calif.

[73] Assignee: Bussco Engineering, Inc., El Segundo, Calif.

[21] Appl. No.: 139,653

[22] Filed: Apr. 14, 1980

[51] Int. Cl.³ .......................... H01B 5/00; H02G 5/00
[52] U.S. Cl. .................................. 174/72 B; 361/328
[58] Field of Search ................. 174/68 B, 70 B, 71 B, 174/72 B, 99 B, 129 B, 133 B; 361/328, 329, 330, 331, 380, 427, 414, 392, 396

[56] References Cited

U.S. PATENT DOCUMENTS

| 3,227,926 | 1/1966 | Parstorfer et al. | 361/396 X |
| 3,708,610 | 1/1973 | Kozel et al. | 174/72 B |
| 4,236,038 | 11/1980 | Taylor | 174/72 B |
| 4,236,046 | 11/1980 | DeVries | 174/72 B |

Primary Examiner—Laramie E. Askin
Assistant Examiner—D. A. Tone
Attorney, Agent, or Firm—Jack C. Munro

[57] ABSTRACT

A bus bar assembly which uses a separate pair of electrical conducting members. Between the electrical conducting members there is located a selectively variable capacitance assembly. The entire bus bar assembly is hermetically sealed by a covering assembly once a desired amount of capacitance has been located between the electrical conducting members.

6 Claims, 2 Drawing Figures

U.S. Patent  Aug. 10, 1982  4,343,965
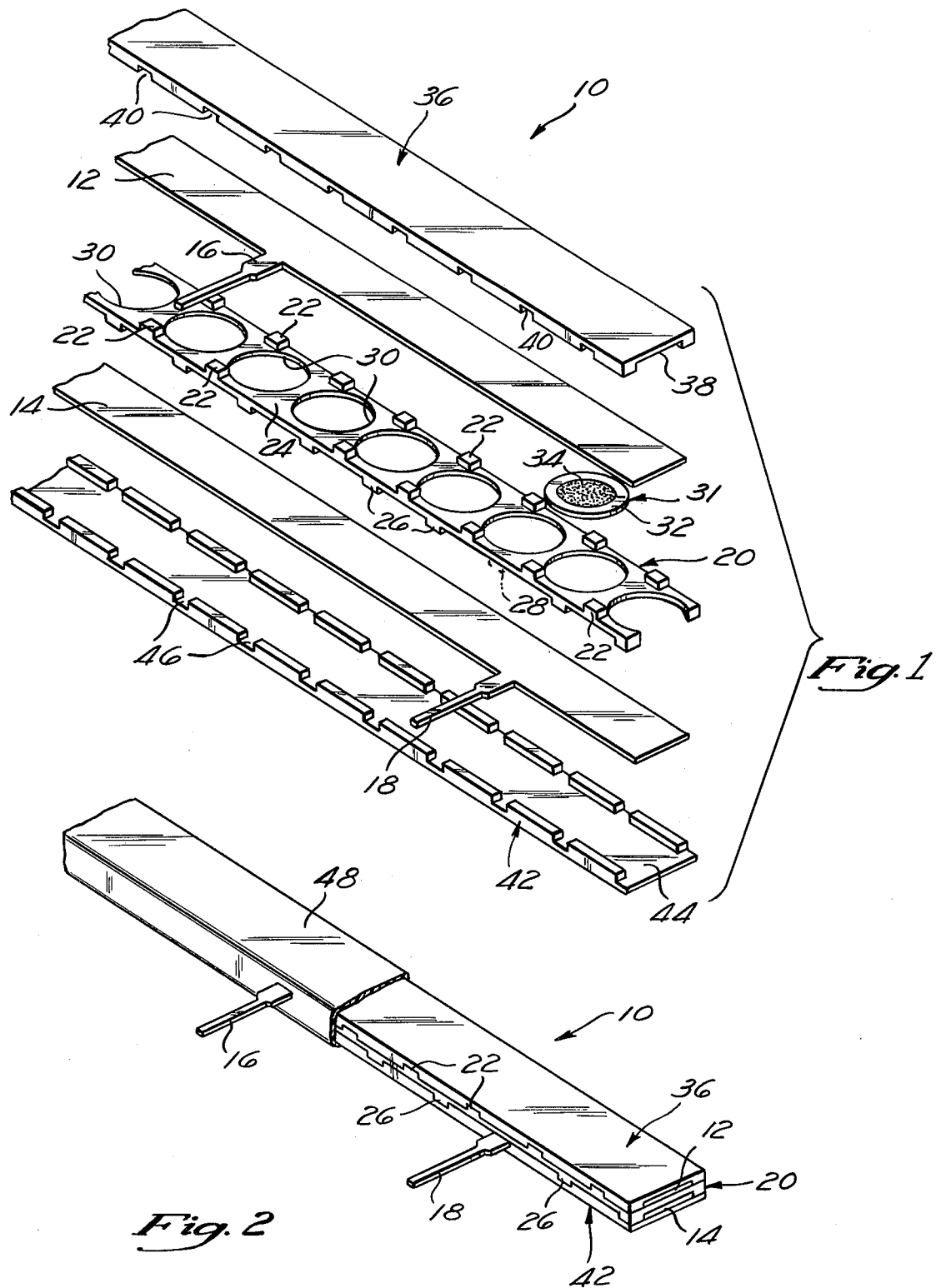

BUS BAR ASSEMBLY

BACKGROUND OF THE INVENTION

The field of this invention relates to electrical conductors and more particularly to a bus bar assembly which internally includes a predetermined selected amount of capacitance.

The use of printed circuit boards for establishing a given electrical circuit is well known. In using printed circuit boards, it is normally mandatory that a certain amount of electrical devices, such as capacitors, common grounds known as bus bars, resistors and inductors be mounted directly on the circuit board and be electrically connected with the electrical circuit of the board. Each of these electrical elements take up physical space. It is becoming more and more preferred to condense each printed circuit board into a space as small as possible. This means that the overall space is less of the electrical equipment within which is incorporated the printed circuit boards.

Within printed circuit boards there is commonly used a bus bar which functions to conduct electrical current from one electrical connector of the bus bar to another electrical connector. Bus bars are known to have a very low capacitance. Without capacitance, electrical noise can quickly become a significant problem. The noise is created by surges of electricity through the bus bar. This noise can cause undesirable operation of the printed circuit board.

It has been known that use of capacitors minimizes noise. Capacitors are normally mounted within the printed circuit board in physical close proximity to a bus bar and are electrically connected therewith. A common form of capacitor at the present time comprises a ceramic disc upon which has been coated on each side thereof a layer of silver. This ceramic disc is then hermetically sealed in a resin. An electrical conductor connects with each silver coating and extends exteriorly of the hermetic seal. These electrical conductors are mounted to appropriate electrical connectors within the electrical circuit board.

As previously mentioned, within recent years, there has been a trend to condense the size of the printed circuit boards. It would be desirable if there would be some way to incorporate within the bus bar structure itself a selected amount of capacitance thereby eliminating the use of separate capacitors thereby saving printed circuit board space.

SUMMARY OF THE INVENTION

The structure of this invention relates to a bus bar which includes selected amounts of capacitance. The bus bar assembly of this invention takes the form of a pair of separate elongated electrical conducting members which are found within conventional bus bar structures. These electrical conducting members are electrically connected to appropriate electrical contacts on a printed circuit board. These electrical conducting members, as in a conventional bus bar, are electrically insulated with respect to each other by a strip of insulative material located between the members. This strip of insulative material, or separator, is modified in accordance with the present invention to include a plurality of spaced-apart openings. Each opening is capable of retaining a small disc. This disc, is to comprise a conventional capacitor which takes the form of a ceramic material with an electrically conducting silver coating being located on each side thereof. The silver coatings are to be in direct physical contact with the electrical conducting members with the result being that a capacitor is mounted between the electrical conducting members. By selecting the physical number of discs to be located between the electrical conducting members, the amount of capacitance is thereby varied. The separator is to include a plurality of evenly spaced protuberances on each side thereof. Each protuberance is to matingly connect with a groove formed within a plate. Each plate is to include a longitudinal channel within which is to be supported a single elongated conducting member. There is to be a separate plate located over each elongated electrical conducting member. As a result, the electrical conducting members are interlocked between the plates with the separator and the capacitive discs also interlocked together with the plates. The overall assemblage is then to be hermetically sealed with a layer of plastic or similar material.

The primary objective of this invention is to construct a bus bar assembly which includes a value of capacitance thereby eliminating the need for separate capacitors when the bus bar assembly is mounted in conjunction with a printed circuit board.

Another objective of this invention is to construct a bus bar assembly of an assemblage of parts which are interlocked together forming a substantially integral unit.

BRIEF DESCRIPTION OF THE DRAWING

FIG. 1 is an exploded isometric view of the bus bar assembly of this invention; and FIG. 2 is a partly cut-away, isometric view of an assembled bus bar constructed in accordance with this invention.

DETAILED DESCRIPTION OF THE SHOWN EMBODIMENT

Referring particularly to the drawing, the bus bar 10 of this invention is shown within which is mounted a first electrical conducting member 12 and a second electrical conducting member 14. Each of the members 12 and 14 are basically similar in configuration and each comprise a sheet material narrow elongated strip of metallic electrically conductive material. In most cases, the length of the strips 12 and 14 will be no more than a few inches. However, it is to be understood that any desirable length of the strips 12 and 14 could be employed.

Extending outwardly from each of the strips 12 and 14, and in the same plane of each of the strips, is a connector 16 and 18, respectively. There can be as many of the electrical connectors integrally extending from its respective electrical conductor as is desired. The location of any electrical connector 16 and 18 can be at any longitudinal point along its respective electrical conductor. In actual practice, the electrical conductors 12 and 14 will be manufactured with a plurality of connectors 16 and 18. In the assembling of the bus bar 10, the assembler merely breaks off what connectors are not needed. The electrical connectors 16 and 18 are each to connect to a specific electrical connection point on a printed circuit board (not shown).

Located between the electrical conductors 12 and 14 is a separation member 20. This separation member 20 is to normally be constructed of a plastic material or other non-electrically conductive material. The overall length of the separation member 20 is slightly greater than the length of the conductors 12 and 14. Also, the separation member 20 is primarily constructed of thin sheet material.

Integrally formed and extending outwardly from the upper surface of the member 20 are a plurality of protuberances 22. The protuberances 22 are located adjacent each longitudinal edge of the member 20. The protuberances 22 are evenly spaced apart. The size of the protuberances and their position is so that the inner facing edges of the protuberances 22 form a channel. Where a protuberance 22 interferes with an electrical connection 16, that protuberance 22 is physically removed by cutting or grinding away of the protuberance. Such a removed protuberance is shown at number 24 within the drawing.

The underside of separation member 20 is to be constructed identical to the upper surface. The lower surface of the separation member 20 is to include a channel formed by protuberances 26 within which is to be located the electrical conducting member 14. The protuberance 28 is depicted in phantom which has been removed in order to not interfer with the electrical connector 18.

The net result is the separation member 20 maintains the electrical conductors 12 and 14 in an aligned side-by-side relationship, but with each electrical conductor 12 and 14 establishing its own separate electrical conducting path.

Formed within the separation member 20 are a plurality of spaced-apart openings 30. Within each opening 30 there may be located a capacitor element 31 which takes the form of a ceramic disc 32 which is coated on opposite sides thereof with an electrically conductive silver coating 34. Each capacitive element 31 has a certain predetermined value of capacitance, such as 0.01 of a microfarad. The locating of the capacitive element 31 within an opening 30 results in a capacitive value being electrically connected between electrical conducting members 12 and 14. If it is desired to establish only 0.01 of a microfarad capacitance between the members 12 and 14, then it is required to only insert a single capacitive element 31 therebetween. However, if it is desired that a greater amount of capacitance be obtained, such for example, 0.05 of a microfarad, then it is required to insert five separate discs 31 between the conducting members 12 and 14 with a separate capacitive element 31 being mounted within a separate opening 30.

It is to be understood that the capacitive elements 31 could be constructed to each represent a different amount of capacitance if such was desired. The values herein expressed are merely by way of example.

On the exterior surface of the electrical conducting member 12 is to be mounted a first elongated plate 36. The plate 36 is to be the same length and the same width as the separation member 20. The inside surface of the plate 36 is formed to include an elongated channel 38 within which is to be located the conducting member 12. Along each longitudinal edge of the plate 36 on either side of the channel 38 is a raised ridge. Within each raised ridge are located grooves 40. Each protuberance 22 is to matingly cooperate within a groove 40.

Covering the outer surface of the plate 14 is a plate 42. The plate 42 is identical to the plate 36 and includes an elongated channel 44 within which is to be positioned the conducting electrical conducting member 14. Adjacent the longitudinal edges of the inside surface of the plate 42 are ridges which are interspersed with grooves 46. A single protuberance 26 is to be located within a single groove 46. It is to be understood that the electrical connnector 18 will extend through one of the grooves 46 and similarly the electrical connector 16 will extend through one of the grooves 40.

When the bus bar 10 is in the assembled condition, as shown in FIG. 2 of the drawing, it is required to hermetically seal the bus bar assembly. In order to do this, an outer covering 48 is placed over the assembled bus bar 10. This covering 48 will normally take the form of a liquid plastic. However, possibly the plates 36 and 42 could be internally bonded achieving the same hermetic sealing arrangement.

What is claimed is:
1. A bus bar assembly comprising:
a first elongated electrical conducting member, a second elongated electrical conducting member, both said first and second conducting members being constructed of sheet material, each of said conducting members having electrical connectors adapted to electrically connect with electrical circuitry;
a separation member being located between said first member and said second member, said separation member being non-electrically conductive to electrically insulate said first and second members, an opening assembly formed within said separation member;
a capacitor assembly located within said opening assembly, said capacitor assembly to provide an electrical capacitance between said first and said second members, said capacitor assembly being connected only by direct physical contact with both said elongated electrical conducting members to establish an electrical connection therebetween;
a covering assembly exteriorly encasing said elongated members, said covering assembly electrically insulating said elongated members to the ambient, said covering assembly including a pair of elongated plates, one of said elongated plates to be located directly adjacent the exterior surface of said first elongated electrical conducting member with the other of said elongated plates being located directly adjacent the exterior surface of said second elongated electrical conducting member; and
interlocking means located between each of said elongated plates and said separation member, said interlocking means functioning to lock together said plates and said separation member as well as said first and second elongated members into a single substantially integral unit, said interlocking means comprising a mating protuberance and groove assembly.

2. The bus bar assembly as defined in claim 1 wherein:
said opening assembly comprising a plurality of separate spaced-apart openings, said capacitor assembly taking the form of capacitor elements, a separate said capacitor element in each of said openings, whereby by selecting the physical number of said capacitor elements cooperating with said opening assembly the overall capacitance between said members is thereby regulated.

3. The bus bar assembly as defined in claim 2 wherein:
each said capacitor element comprises a disc.

4. A bus bar assembly comprising:
a first elongated electrical conducting member, a second elongated electrical conducting member, each of said conducting members having electrical connectors adapted to electrically connect with electrical circuitry;

a separation member being located between said first member and said second member, said separation member being non-electrically conductive to electrically insulate said first and second members, an opening assembly formed within said separation member;

a capacitor assembly located within said opening assembly, said capacitor assembly to provide an electrical capacitance between said first and said second members, said capacitor assembly being in direct contact with both said elongated members;

a covering assembly exteriorly encasing said elongated members, said covering assembly electrically insulating said elongated members to the ambient;

said covering assembly including a pair of elongated plates, one of said elongated plates to be located directly adjacent the exterior surface of said first elongated electrical conducting member with the other of said elongated plates being located directly adjacent said second elongated electrical conducting member, a layer of material located about and hermetically sealing the assembled group of said plates and said first and second members and said separation member and said capacitor assembly; and interlocking means located between each of said elongated plates and said separation member, said interlocking means functioning to lock together said plates and said separation member as well as said first and second elongated members into a single substantially integral unit, said interlocking means comprising a mating protuberance and groove assembly.

5. The bus bar assembly as defined in claim 4 wherein: said opening assembly comprising a plurality of separate spaced-apart openings, said capacitor assembly taking the form of a plurality of capacitor elements, a separate said capacitor element to be locatable within a separate said opening, whereby by selecting the physical number of said capacitor elements cooperating with said opening assembly, the overall capacitance between said members is thereby regulated.

6. The bus bar assembly as defined in claim 5 wherein: each said capacitor element comprising a disc.

* * * * *